(12) United States Patent
Horie

(10) Patent No.: US 6,231,360 B1
(45) Date of Patent: May 15, 2001

(54) MEMORY CARD ADAPTER

(75) Inventor: Naoya Horie, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/523,171

(22) Filed: Mar. 10, 2000

(30) Foreign Application Priority Data

Mar. 12, 1999 (JP) .................................................. 11-066412
Jan. 13, 2000 (JP) .................................................. 12-004294

(51) Int. Cl.$^7$ .................................................. H01R 13/62
(52) U.S. Cl. .......................... 439/159; 439/945; 439/946
(58) Field of Search ............................ 439/159, 152, 439/155, 160, 76.1, 928.1, 945, 946, 630, 638, 862

(56) References Cited

U.S. PATENT DOCUMENTS

| | | | |
|---|---|---|---|
| 5,305,180 | * | 4/1994 | Mitchell et al. ........................ 439/159 |
| 5,653,596 | * | 8/1997 | Banakis et al. ........................ 439/946 |
| 5,667,396 | * | 9/1997 | Pan et al. ............................... 439/160 |
| 5,889,649 | * | 3/1999 | Nabetani et al. ..................... 439/945 |
| 5,906,516 | * | 5/1999 | Sato et al. ............................. 439/946 |
| 6,027,351 | * | 2/2000 | Hashimoto ............................ 439/160 |
| 6,071,130 | * | 6/2000 | Johnson ................................ 439/946 |

FOREIGN PATENT DOCUMENTS

| | | |
|---|---|---|
| 7-28966 | 11/1995 | (JP) . |
| 10-21350 | 1/1998 | (JP) . |
| 2846301 | 10/1998 | (JP) . |

* cited by examiner

*Primary Examiner*—Paula Bradley
*Assistant Examiner*—Tho D. Ta
(74) *Attorney, Agent, or Firm*—Wenderoth, Lind & Ponack, L.L.P.

(57) ABSTRACT

A memory card adapter comprises a board, a frame for holding the board, and an elastic member. The elastic member contacts a memory card and applies pressing force to the memory card for suppressing the ejection of the memory card. The above structure prevents damage or less of the memory card during ejection of the memory card.

8 Claims, 2 Drawing Sheets

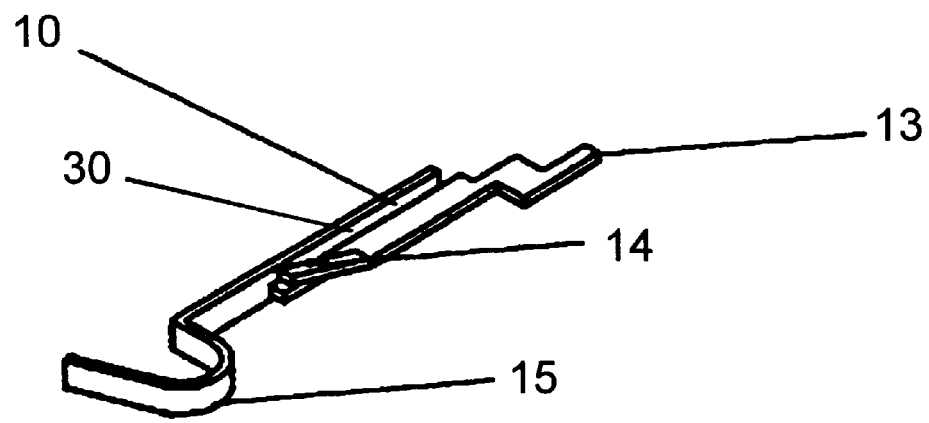
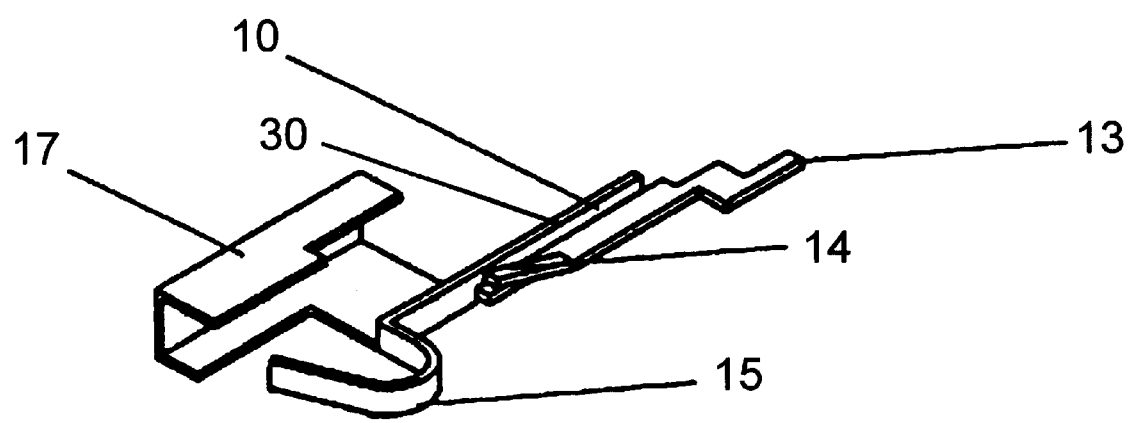

MEMORY CARD ADAPTER

FIELD OF THE INVENTION

The present invention relates to a memory card adapter, and, more particular, the invention relates to an adapter for setting a small memory card, which is used for a Personal Digital Assistant (PDA), a digital camera or the like, into the slot of an apparatus such as a personal computer or the like. The slot conforms to a personal computer card (PC card) standardized by Personal Computer Memory Card International Association (PCMCIA) and Japan Electronic Industry Development Association (JEIDA).

BACKGROUND OF THE INVENTION

A PC card widely used for a personal computer or the like is standardized by PCMCIA and JEIDA, and the standardized PC card has outer dimensions of length 85.6 mm, width 54.0 mm and thickness 5.0 mm.

However, according to the decrease of the size of an apparatus such as a PDA, a portable telephone, a digital camera or the like, a smaller memory card has been required. For example, a memory card having outer dimensions of length 45.0 mm, width 42.8 mm and thickness 3.3 mm, for instance, or various memory cards having smaller sizes (e.g., postage stamp size) have been proposed, and such small memory cards are already in the market.

Under the above circumstance, adapters which enable the setting of such newly developed small memory cards into a slot for the widely used standardized PC card have been developed.

In these days, a memory card adapter of a beginning stage having a simple manual mechanism for ejecting the memory card has been replaced by a memory card adapter having an ejecting mechanism sophisticated for smoother ejection of the memory card.

Hereinafter the structure of a memory card adapter having the conventional ejecting mechanism is described.

On a circuit board held by a resinous frame, a memory IC (integrated circuit), a grounding coil spring, a connector and the like are mounted. The upper side and the lower side of the frame are respectively covered by metal plates. The grounding coil spring contacts with the metal plates. The connector of the memory card adapter contacts the signal-contact of the memory card when the memory card is set in the slot of the memory card adapter. An ejecting shaft for ejecting the memory card is disposed in the frame in such a manner as to be slidable along the inserting and ejecting direction of the memory card and to locate near the slot of the memory card adapter into which (i.e., the slot) the memory card is inserted. An arm having a bent portion at one end is disposed in such a manner that the center portion of the arm is rotatably supported by the resinous frame. The other end of the arm is connected to the ejecting shaft. The bent portion of the arm is formed in such a manner as to touch a portion of the memory card (which portion is located alongside the signal-contact of the memory card), and to hold the memory card inserted into the slot of the adapter.

In ejecting the memory card from the adapter having the above structure, the ejecting shaft is pushed with a finger along the inserting direction of the memory card. The pushing force applied to the ejecting shaft is conveyed to the bent portion of the arm, whereby the bent portion is moved along the ejecting direction touching the portion aside the signal-contact of the memory card, so that the memory card is ejected.

In some cases, a memory card has significant static electricity when the memory card is inserted into the slot of a memory card adapter. Therefore, it is essential to provide a grounding circuit for discharging the static electricity charged in the memory card before the signal-contact of the memory card contacts the connector of the memory card adapter. A device for discharging (i.e., grounding) static electricity charged in a memory card is proposed in Japanese Non-examined Patent Publication H7-28966, for instance.

However, in the above conventional structure, when a memory card is separated from the connector of the adapter by pushing the ejecting shaft of the adapter, the force for holding the memory card is removed. Thus, the memory card is forcibly ejected and slipped off from the slot of the adapter, which results in an inconvenience such as dropping the memory card on a floor giving a shock to the memory card or losing the memory card. Such inconvenience particularly is liable to occur in the case of a small and light memory card of postage stamp size. Also, in the conventional structure, a separate grounding device is needed, which results in the increase of the number of component parts and the increase of cost.

SUMMARY OF THE INVENTION

The object of the present invention is to address the conventional problems and to provide a memory card adapter which holds a memory card and sets the memory card into the slot for a PC card. The slot is installed in an apparatus such as a personal computer or the like. The memory card adapter has a low cost structure, and surely prevents the slip off of the memory card from the slot of the memory card adapter, and also surely discharges static electricity charged in the memory card.

For realizing the above object, the memory card adapter of the present invention comprises, a board, a frame for holding the board, and an elastic member for contacting the memory card, and for applying a pressing force to the memory card for suppressing the ejection of the memory card.

In the above structure, the elastic member applies elastic pressing force to the memory card. The elastic pressing force board creates adequate frictional force for suppressing the ejection of the memory card, whereby the memory card is held in the slot of the memory card adapter after moving a predetermined dimension in the slot along the ejecting direction. As a result, the slip off (i.e., the dropping or losing) of the memory card from the slot of the memory card adapter is prevented when ejecting the memory card.

Also, for realizing the above object, the memory card adapter of the present invention comprises, a board, a frame for holding the board, metal plates for covering the frame, and a contact unit having integrated structure. The integrated contact unit includes and elastic member for contacting a memory card, and for applying pressing force to the memory card for suppressing the ejection of the memory card, a metal-plate-contact-member for contacting with the metal plates, and a conductive member for forming the integrated structure of the contact unit, and for electrically connecting the elastic member and the metal-plate-contact-member, and for discharging static electricity charged in the memory card.

Also for realizing the above object, the memory card adapter of the present invention comprises a board, a frame for holding the board, metal plates for covering the frame, and a contact unit having an integrated structure. The integrated contact unit includes an elastic member for contacting a memory card, and for applying pressing force to the memory card for suppressing the ejection of the memory card, a conductive board-contact-member for contacting a grounding member disposed on the board, and a conductive member for forming the integrated structure of the contact unit for electrically connecting the elastic member and the board-contact-member, and for discharging static electricity charged in the memory card.

Also, for realizing the above object, the memory card adapter of the present invention comprises, a board, a frame for holding the board, metal plates for covering the frame, and a contact unit having integrated structure. The integrated contact with includes an elastic member for contacting the memory card, and for applying pressing force to the memory card for suppressing the ejection of the memory card, a metal-plate-contact-member for contacting the metal plates, a board-contact-member for contacting with a grounding member disposed on the board, and a conductive member for forming the integrated structure of the contact unit, for electrically connecting the elastic member, the metalplate-contact-member and the board-contact-member, and for discharging static electricity charged in the memory card.

In the above structure, the elastic member applies elastic pressing force to the memory card which creates adequate frictional force for suppressing the ejection of the memory card. As a result the memory card is held in the slot of the memory card adapter after moving a predetermined distance in the slot along the ejecting direction. As a result, the slip off (i.e., the dropping or losing) of the memory card from the slot of the memory card adapter is prevented during ejection of the memory card. The elastic member also has the finction of contacting the memory card for discharging static electricity charged in the memory card through the conductive constituting members of the contact unit.

Also, in the above structure, since the contacy unit has an integrated structure in performing the function of discharging (i.e., grounding) static electricity, a separate grounding member (which is used in the conventional structure) is not needed, stable grounding is realized, the number of component parts is decreased, and space saving is realized. Also, by forming the contact unit to have an integrated structure comprising the elastic member, together with the conductive member and at least one of the metal-plate- and the board-contact-member, the number of component parts is decreased as compared with the case of forming the elastic member separately.

Also, by forming the metal-plate-contact-member in such a manner as to contact the metal plates of both upper side and lower side of the frame, static electricity charged in the memory card is more surely discharged.

Also, by forming the contact unit to have an integrated structure further comprising the grounding contact member which discharges static electricity from the memory card adapter to an apparatus in which the memory card adapter is set, the number of component parts is further decreased and the static electricity charged in the memory card is surely discharged.

BRIEF DESCRIPTION OF THE DRAWINGS

FIG. 3 shows an example of the structure of the contact unit of the memory card adapter in the same embodiment of the present invention, and FIG. 4 shows another example of the structure of the contact unit of the memory card dapter in the same embodiment of the present invention.

DETAILED DESCRIPTION OF THE INVENTION

Hereinafter memory card adapters in exemplary embodiments in the present invention are described with reference to illustrations.

Figure 1:
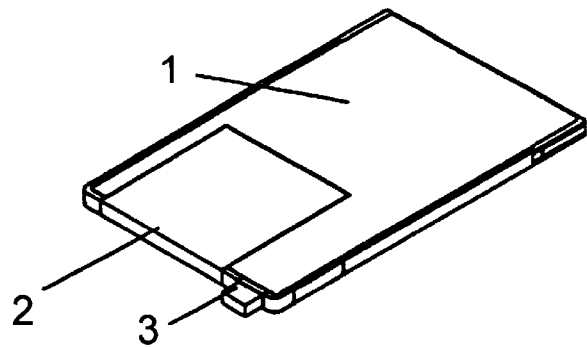
FIG. 1 is a perspective view showing a state in which a memory card is set in the slot of a memory card adapter in an exemplary embodiment of the present invention.
Figure 2:
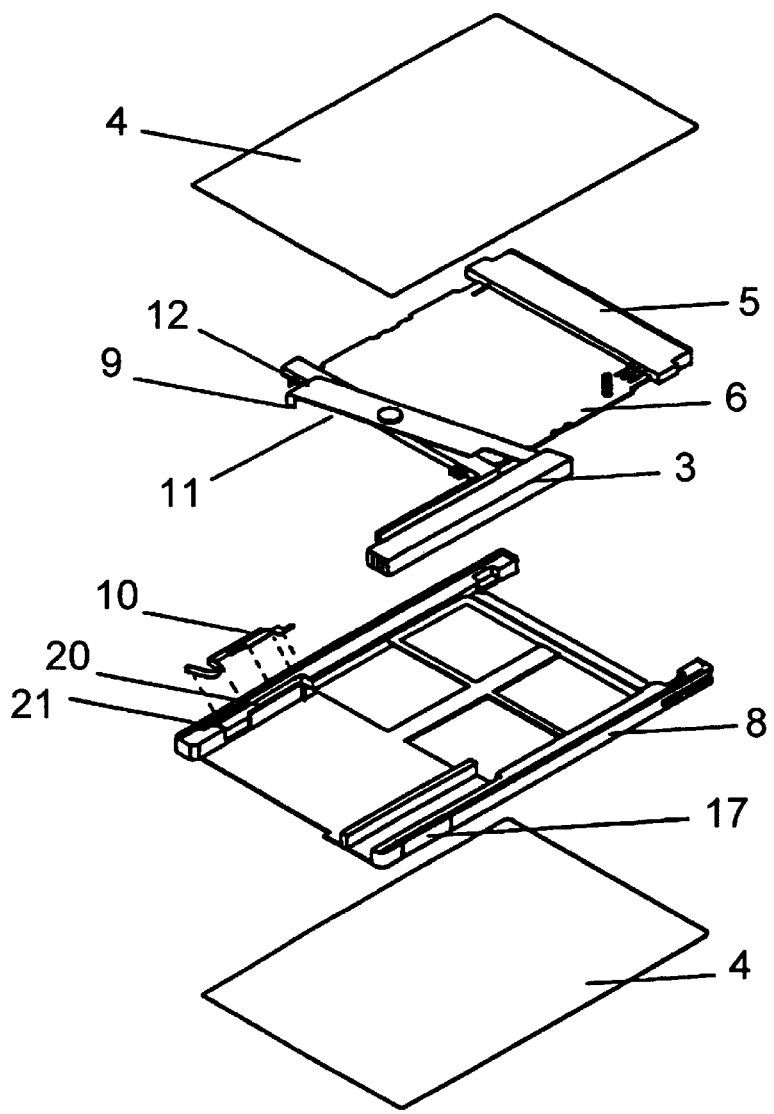
FIG. 2 is an exploded perspective view showing the memory card adapter in the same embodiment of the present invention.

FIG. 1 shows a state in which a memory card 2 is set in the slot of a memory card adapter 1 in an exemplary embodiment of the present invention. The memory card adapter 1 is further set in a slot for a PC card, and the slot is installed in an apparatus such as a personal computer or the like.

Hereinafter the details of the structure of the memory card adapter 1 is described with reference to FIG. 1 through FIG. 4.

On a resinous frame 8, a circuit board 6 having a first connector 5 and a second connector 11 is disposed. The first connector 5 disposed at one end of the circuit board 6 contacts the signal-contact of an apparatus such as a personal computer or the like when the memory card adapter 1 is set in a slot for a PC card and the slot is installed in the apparatus. The second connector 11 disposed at the other end of the circuit board 6 contacts the signal-contact of the memory card 2 when the memory card 2 is set in the slot of the memory card adapter 1. After disposing the circuit board 6 and the other predetermined component parts in the frame 8, a pair of metal plates 4 are disposed on the upper side and the lower side of the frame 8 in such a manner as to cover the frame 8.

The frame 8 has an area for accommodating the circuit board 6, and an area for forming a slot for holding the memory card 2. On both sides of the frame 8 near the area where the slot is formed, grounding contact members 17 for discharging static electricity from the memory card adapter 1 to the grounding member of the apparatus are disposed. The grounding contact members 17 respectively contact the metal plates 4 in a state in which metal plates 4 are respectively fixed to the upper side and the lower side of the frame 8.

The slot of the memory card adapter 1 has the following structure. A guide rail having a cut portion 21 is provided at a first side of the frame 8 so that the memory card 2 is smoothly and surely inserted or ejected. Between the first side of the frame 8 and the guide rail, an area 20 for disposing a contact unit 10 is formed. At the second side of the frame 8, which faces the first side of the frame 8, an ejecting shaft 3 is disposed in such a manner as to be slidable along the inserting and ejecting direction of the memory card 2 (i.e. along the second side of the frame 8).

An arm 12 having a bent portion 9 at one end is disposed in such a manner that the center portion of the arm 12 is rotatably supported by the second connector 11 which contacts the signal-contact of the memory card 2 when the memory card 2 is set in the slot of the memory card adapter 1. The other end of the and 12 is connected to the ejecting shaft 3. The bent portion 9 of the arm 12 is formed in such a manner as to touch a portion of the memory card 2 (located alongside the signal-contact of the memory card 2), and to hold the memory card 2.

FIG. 3 shows an example of contact unit 10, which has an integrated structure comprising a conductive elastic member 15, a conductive circuit-board-contact-member 13, a conductive metal-plate-contact-member 14 and a conductive connecting member 30. The conductive circuit-board-contact-member 13 is connected by soldering to a conductive grounding pattern formed on the circuit board 6. The conductive metal-plate-contact-member 14 contacts at least one of the pair of metal plates 4. The conductive elastic member 15, whose U-shaped portion protrudes through a slit formed in the cut portion 21 of the guide rail, elastically contacts one side of the memory card 2.

In FIG. 3, a split portion at the end portion of the conductive metal-plate-contact-member 14 is bent upward so that the split portion elastically contacts the metal plate 4 disposed at the upper side of the frame 8. The conductive metal-plate-contact-member 14 can be also formed in such a manner as to contact both the upper side and lower side of the metal plates 4 by bending one split portion of the conductive metal-plate-contact-member 14 upward and the other split portion thereof downward.

FIG. 4 shows another example of the contact unit 10, which has an integrated structure further comprising the grounding contact member 17 which discharges static electricity from the memory card adapter 1 to the grounding member of an apparatus in which the memory card adapter 1 is set.

The operation of the memory card adapter 1 of this exemplary embodiment having the above structure is described hereinafter.

The memory card 2 is inserted into the slot of the memory card adapter 1 along the guide rail, whereby the signal-contact of the memory card 2 contacts the second connector 11 of the memory card adapter 1. In this case, the memory card 2 contacts the conductive elastic member 15 (i.e., the contact unit 10) of the memory card adapter 1 before the signal-contact of the memory card 2 contacts the second connector 11, whereby static electricity charged in the memory card 2 is surely discharged through a current route ranging in the order of the contact unit 10 first, the metal plates 4 next, then the grounding contact member 17, and last, the grounding member of an apparatus (e.g., personal computer) in which the memory card adapter 1 is set. Alternatively, it can be discharged through a current route ranging in the order of the contact unit 10 first, then the grounding conductive pattern formed on the circuit board 6, and last, the grounding member of the apparatus.

In ejecting the memory card 2, the ejecting shaft 3 is pushed along the inserting direction of the memory card 2 with a finger, whereby the arm 12 rotates on the center portion thereof where the arm 12 is rotatably supported by the second connector 11. As a result, the memory card 2 is pushed with the bent portion 9 of the arm 12 along the ejecting direction of the memory card 2, and is separated from the bent portion 9 and from the connector 11. In this occasion, the ejecting force applied to the memory card 2 is suppressed by frictional force created by the elastic pressing force applied in a sideways direction to the memory card 2 by the elastic member 15, whereby the memory card 2 is held in the slot of the memory card adapter 1 without slipping out of the slot of the memory card adapter 1.

In the above description, the memory card 2 is ejected by the pushing force applied to the ejecting shaft 3. However, the above structure for suppressing the ejection of the memory card 2 is applicable to a memory card adapter having the structure for ejecting the memory card 2 with the resilient force of a spring, which moves the memory card 2 along the ejecting direction of the memory card 2 when the memory card 2 is separated from the bent portion 9 by pushing the ejecting shaft 3.

Also, in the above structure, since the contact unit 10 has an integrated structure comprising the conductive metal-plate-contact-member 14 which contacts the conductive pattern formed on the circuit board 6, a coil spring used in a conventional memory card adapter is not needed.

Also, by forming the contact unit 10 to have an integrated structure further comprising the grounding contact member 17 as shown in FIG. 4, the number of component parts of memory card adapter 1 is further decreased, and the reliability of discharging static electricity increases.

As described above, in the memory card adapter of the present invention, static electricity in a memory card is surely discharged, and the memory card is held without slipping out of the slot of the memory card adapter when ejecting the memory card, which results in an increase of safety in practical use. Also the structure of the memory card adapter is simplified by decreasing the number of component parts in a manner that a coil spring used in the conventional structure is eliminated, and the contact unit is formed to have integrated structure further comprising the grounding contact member for discharging static electricity from the memory card adapter to the conductive member of an apparatus.

The above effects of the memory card adapter of the present invention increase when the size of the memory card decreases. Also the above effects can be obtained in various combinations between memory cards of various specifications and the various types of slots installed in various apparatuses such as personal computers and the like, also in any other mechanisms having the similar structure. Therefore the present invention includes these variations as well.

What is claimed is:

1. A memory card holding adapter comprising:
   a circuit board;
   a frame holding said circuit board;
   metal plates covering said frame; and
   a contact unit having a one-piece structure, said contact unit including:
   a conductive elastic member for contacting the memory card, for discharging static electricity charged in the memory card, and for applying a pressing force to the memory card so as to suppress an ejection of the memory card;
   a metal-plate-contact-member contacting at least one of said metal plates; and
   a conductive connecting member electrically connecting said conductive elastic member and said metal-plate-contact-member, wherein said conductive elastic member, said metalplate-contact-member, and said conductive connecting member form said one-piece structure of said contact unit.

2. The adapter of claim 1, wherein an upper one of said metal plates covers an upper side of said frame, and a lower one of said metal plates covers a lower side of said frame, said metal-plate-contact-member contacting said upper one of said metal plates and said lower one of said metal plates.

3. The adapter of claim 1, wherein said contact unit further includes a grounding contact member for discharging static electricity to a grounding member of a host apparatus, wherein said conductive elastic member, said metal-plate-contact-member, said conductive connecting member, and said grounding contact member form said one-piece structure of said contact unit.

4. A memory card holding adapter comprising:
   a circuit board;
   a frame holding said circuit board;

metal plates covering said frame; and a contact unit having a one-piece structure, said contact unit including:

a conductive elastic member for contacting the memory card, for discharging static electricity charged in the memory card, and for applying a pressing force to the memory card so as to suppress an ejection of the memory card;

a circuit board-contact-member contacting a grounding member disposed on said circuit board; and a conductive connecting member electrically connecting said conductive elastic member and said circuit board-contact-member, wherein said conductive elastic member, said circuit board-contact-member, and said conductive connecting member form said one-piece structure of said contact unit.

5. The adapter of claim 4, wherein said contact unit further includes a grounding contact member for discharging static electricity to a grounding member of a host apparatus, wherein said conductive elastic member, said circuit board-contact-member, said conductive connecting member, and said grounding contact member form said one-piece structure of said contact unit.

6. A memory card holding adapter comprising:

a circuit board;

a frame holding said circuit board;

metal plates covering said frame; and a contact unit having a one-piece structure, said contact unit including:

a conductive elastic member for contacting the memory card, for discharging static electricity charged in the memory card, and for applying a pressing force to the memory card so as to suppress an ejection of the memory card;

a metal-plate-contact-member contacting at least one of said metal plates;

a circuit board-contact member contacting a grounding member disposed on said circuit board; and a conductive connecting member electrically connecting said conductive elastic member, said metal-plate-contact-member, and said circuit board-contact-member, wherein said conductive elastic member, said metal-plate-contact-member, said circuit board-contact-member, and said conductive connecting member form said one-piece structure of said contact unit.

7. The adapter of claim 6, wherein an upper one of said metal plates covers an upper side of said frame, and a lower one of said metal plates covers a lower side of said frame, said metal-plate-contact-member contacting said upper one of said metal plates and said lower one of said metal plates.

8. The adapter of claim 6, wherein said contact unit further includes a grounding contact member for discharging static electricity to a grounding member of a host apparatus, wherein said conductive elastic member, said metal-plate-contact-member, said circuit board-contact-member, said conductive connecting member, and said grounding contact member form said one-piece structure of said contact unit.

\* \* \* \* \*